United States Patent [19]

Wilhelm, Jr. et al.

[11] 3,914,585

[45] Oct. 21, 1975

[54] SHEET MOVING AVERAGE FILTER CONTROLLER

[75] Inventors: Robert G. Wilhelm, Jr.; John Francis Donoghue, both of Columbus, Ohio

[73] Assignee: Industrial Nucleonics Corporation, Columbus, Ohio

[22] Filed: Feb. 13, 1974

[21] Appl. No.: 442,172

[52] U.S. Cl. ............. 235/151.3; 250/572; 250/563; 73/159

[51] Int. Cl.$^2$ ...................... G01N 33/34; G01B 7/06

[58] Field of Search ........ 235/151.3, 151.35; 73/75, 73/73, 159, 162; 425/140, 141; 250/572, 563; 356/161, 167

[56] References Cited

UNITED STATES PATENTS

| | | | |
|---|---|---|---|
| 3,067,939 | 12/1962 | Ziffer | 235/151.3 X |
| 3,170,140 | 2/1965 | Brucker-Steinkuhl | 340/149 |
| 3,212,127 | 10/1965 | Flook, Jr. et al. | 425/141 |
| 3,471,685 | 10/1969 | Bishop | 235/151.3 X |
| 3,508,035 | 4/1970 | Worthley | 235/151.3 |
| 3,510,374 | 5/1970 | Walker | 425/141 X |
| 3,552,203 | 1/1971 | Freeh | 73/159 |
| 3,562,500 | 2/1971 | Grant | 235/151.3 |
| 3,610,899 | 10/1971 | Dahlin | 235/151.3 |
| 3,840,302 | 10/1974 | Brunton et al. | 356/167 |
| 3,855,467 | 12/1974 | Chope | 250/572 |

*Primary Examiner*—Edward J. Wise
*Attorney, Agent, or Firm*—William T. Fryer, III; Allan M. Lowe, Esq.; C. Henry Peterson

[57] ABSTRACT

A machine direction characteristic of a moving sheet is controlled by measuring a property of the sheet affected by the characteristic by scanning a gauge for the property in a direction between the sheet edges over substantially the entire width of the sheet a plurality of times. A response of the gauge is averaged over an integral number of the scans so as to substantially remove cross-direction variations in the gauge response. As the gauge is scanning across the sheet the average over the integral number of scans is moved so that the most recent gauge response at different cross sheet points is included in the average and a previous gauge response is removed from the average. As the average is moved, the machine direction characteristic is controlled, so that control is performed a plurality of times during the scan. The property may be measured while the gauge is scanned in only one direction, in which case the response is averaged over any integral number of scans. In the alternative, the property may be measured while the gauge is scanned in both directions, in which case the response may be averaged over the time required for an even number of the scans or the moving average may be spatially averaged over any number of scans. To provide control within a transport lag time that exists from the time the control is made until the time the gauge measures the portion of the sheet controlled, the response of a machine processing the sheet is modeled.

29 Claims, 5 Drawing Figures

SHEET MOVING AVERAGE FILTER CONTROLLER

FIELD OF INVENTION

The present invention relates generally to sheet controllers employing scanning gauges and more particularly to a scanning gauge sheet controller employing a moving average filter.

BACKGROUND OF THE INVENTION

It is common practice in the sheet manufacturing art to control a machine direction characteristic of a moving sheet by scanning a gauge for measuring a property of the sheet affected by the characteristic across the width of the sheet, in a direction between the sheet edges. The response from the gauge is averaged, typically, once per scan and the resultant scan average is employed as an input for the machine direction controller. By scanning a gauge across the sheet, control is responsive to the characteristics of the entire sheet, rather than only one zone, as would be the case with a so-called single point gauge. However, the gauge response must be averaged once a scan to remove cross-direction variations from the input to the controller. The scan average of the cross direction sheet variations tends to be constant from scan to scan since the cross-direction variations tend to change slowly in time compared to machine variations. As a result, by averaging the gauge response over a scan, the cross-direction variations individually have virtually no effect on the machine direction controller.

A problem with the typical machine direction controller responsive to a scanning gauge is the relatively long time interval required to scan a gauge across a sheet to derive accurate information. Typically, the scan time is between 30 seconds and 2 minutes, which limits the frequency of the machine direction control to a 30 second to 2 minute interval. While faster scanning of the gauge may be employed to improve the machine direction control frequency response, faster scanning degrades cross-direction information by filtering that information more heavily, which filtering may result in erroneous operation of the machine direction controller. Also, the information obtained from a slow scan may be highly desirable for other control purposes, particularly cross-direction control, as well as for non-control purposes, such as data presentation. It is, therefore, highly desirable to provide a relatively slow scan and be able to control machine direction characteristics a plurality of times during each slow scan.

We are aware that U.S. Pat. 3,552,203, to Freeh, discloses a system wherein a machine direction controller is activated more often than once a scan of a scanning gauge. In Freeh, the machine direction control is provided by scanning the gauge across the sheet a number of times and deriving a composite profile from the plural gauge scans by averaging the gauge response in a number of longitudinal zones of the sheet, which extend along the sheet at different cross sheet locations. The composite profile for a particular zone is subtracted from the gauge response while the gauge is crossing that zone. The resulting difference signal is applied to a controller for the machine direction characteristic. For many sheet process control applications, the system of the present invention has significant advantages over the system disclosed in the Freeh patent in that it may avoid the need for the apparatus required to derive a composite profile and it can provide more accurate control in the presence of a substantial amount of random variations (neither pure machine direction nor pure cross-direction) or where the machine direction variations are severe with regard to amplitude and/or frequency.

BRIEF DESCRIPTION OF THE INVENTION

In accordance with the present invention, machine direction variations of a moving sheet are controlled more frequently than once per scan by averaging a response of the gauge over an integral number of the scans so as to substantially remove cross-direction variations in the gauge response and moving the average over the entire width. As the gauge is moving across the sheet, the most recent gauge response at different cross sheet points is included in the average and a previous gauge response is removed from the average. The resulting moving average filter and control can be either on a continuous basis, or on a sampled, discrete time basis. If the moving average is continuously derived, it has a transfer function, G(s), represented by:

$$G(s) = \frac{1 - e^{-sT}}{sT} \quad (1)$$

where:

$s$ = the LaPlace transform operator,
$e$ = the base of natural logarithms, and
$T$ = the time of the integral number of scans.

The transfer function of Equation (1) is implemented by supplying the gauge response to an integrator and delaying the integrator output. The delayed and undelayed integrator outputs are combined in a subtractive manner. For discrete, sampled control, the moving average filter G(z) is represented as a z transfer function in accordance with:

$$G(z) = \frac{1 - z^{-m}}{m(1 - z^{-1})} \quad (2)$$

where:

$z^{-1}$ = transform of the delay time between adjacent samples,
$m$ = the number of samples taken over the integral number of scans, and
$z^{-m}$ = transform of the delay time over an $m$ sample interval.

The apparatus for implementing Equation (2) involves storing the signals over the sampling interval and averaging the stored samples.

The moving average can be obtained by measuring the sheet property only while a gauge is scanning in one direction or by measuring the property while the gauge is scanning in both directions. In the former case, the moving average filter has a time or spatial interval equal to any integral number of scans. In the latter case, the moving average filter can be time integrated over an even number of integral scans. If scanning measurements are performed in both directions, the moving average filter can be spatially averaged over any integral number of scans.

In most sheet processing systems, there is an appreciable transport lag, or dead time, between the point on the sheet where the effect of the controller appears and the location of the gauge. Typically, the transport lag is on the same order of magnitude as the scan time, although in certain instances a transport lag may be a very small fraction of the scan time. To provide control within a scan time in the former case, it is usually necessary to model the static and dynamic characteristics of the machine processing the sheet, including the transport time from the controller station to the measuring gauge. In a continuous system, the model is preferably constructed as disclosed in an article by O. J. M. Smith in the February, 1959 "I.S.A. Journal". If a sampled, discrete controller is employed, the model preferably is of the type disclosed in the co-pending, commonly assigned application of James S. Rice, Ser. No. 8,377, filed Feb. 3, 1970, entitled "Controlled System and Method for Machine or Process Having Dead Time".

It is, accordingly, an object of the present invention to provide a new and improved machine direction sheet controller responsive to an output of a scanning gauge a plurality of times during each scan.

Another object of the invention is to provide a new and improved machine direction sheet controller responsive to a scanning gauge output several times during a scan wherein accurate control is maintained despite a significant amount of random variations or severe machine direction variations being present in the sheet.

The above and still further objects, features and advantages of the present invention will become apparent upon consideration of the following detailed description of several specific embodiments thereof, especially when taken in conjunction with the accompanying drawings.

DETAILED DESCRIPTION OF THE DRAWINGS

Figures 1, 2:
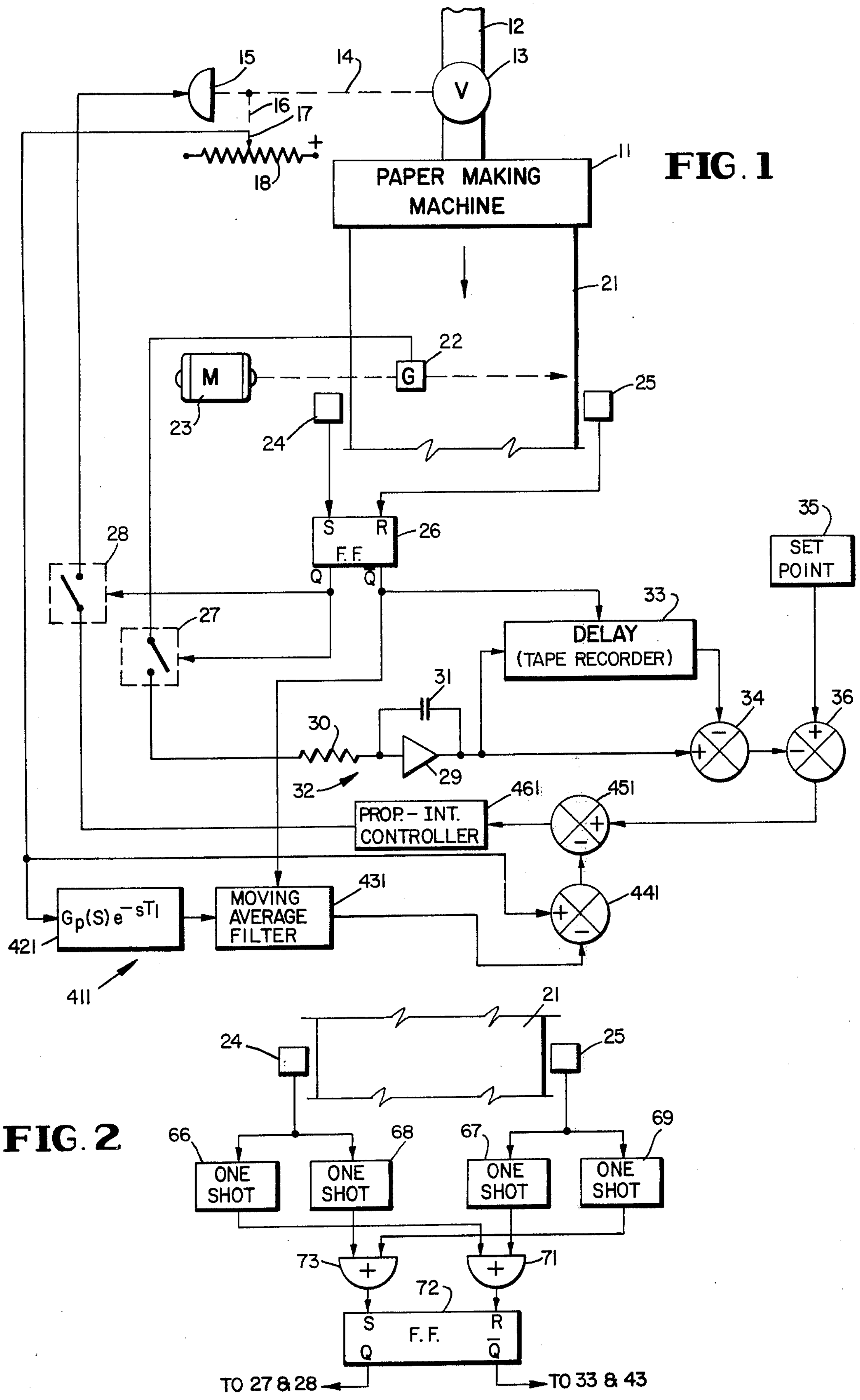
FIG. 1 is a schematic diagram of a first, continuous controller in accordance with the invention, wherein a gauge measures the property in only one scan direction.
FIG. 2 is a circuit diagram indicating changes to be made to the system of FIG. 1 wherein the gauge measures the property while being scanned in both directions.

Reference is now made to FIG. 1 of the drawing wherein the present invention is illustrated in conjunction with machine direction control of a sheet manufactured by a paper making machine. It is to be understood, however, that the principles of the invention are applicable to the machine direction control of any sheet processor and that the example of a paper making machine is illustrative. The paper making machine 11 is responsive to a fiber-water slurry fed to it through conduit 12, with the amount of fiber being controlled by the opening of valve 13, the position of which is controlled by shaft 14 of actuator 15 is responsive to an electrical signal derived from the controller of the present invention and the shaft position can be considered as the integral of the input of the actuator. The shaft position is monitored by a mechanical linkage 16 to slider 17 of potentiometer 18.

Paper making machine 11 responds to the fiber-water slurry supplied to it to form a sheet 21 having a substantial width. The fiber weight per unit area, i.e., bone dry basis weight, of sheet 21 is controlled uniformly across the entire width of sheet 21 by activating valve 13 and controlling the amount of fiber supplied to paper making machine 11. Thereby, machine direction properties of sheet 21 are controlled by the position of valve 13. There are also cross direction variations in sheet 21, i.e., variations in sheet basis weight at different cross sheet points of the sheet. The cross sheet variations occur because of differences in the paper making machine 11 at points within the machine corresponding to different cross sheet locations of the manufactured sheet. There are also variations in the sheet which cannot be separated and determined exclusively as cross sheet or machine direction variations. These variations are frequently referred to in the art random variations.

To monitor machine direction properties of sheet 21, exclusively of the random and cross direction variations, gauge 22 is scanned in a direction between and at right angles to the edges of sheet 21. Gauge 22 measures the bone dry basis weight of the area it scans and may be any well known gauge employed in the art for this purpose, such as a radiation gauge in combination with a dielectric moisture gauge which supply signals to a measuring unit that derives a d.c., analog signal voltage having a magnitude directly proportional to bone dry basis weight. Measurements can be derived from gauge 22 when it is scanned only in one direction, for example from left to right, or in response to the gauge being scanned in both directions. As gauge 22 is scanned, the machine direction and cross direction variations are monitored by it. The gauge response also includes variations that are caused by relative movement of the gauge and sheet in the machine and cross directions, since the gauge actually traverses a diagonal region of the moving sheet, even though the gauge is scanned only in a direction at right angles to the sheet edges.

Gauge 22 is scanned by a constant speed motor 23, whereby the scan time of the gauge, while it is measuring the sheet 21, is a pre-determined, known duration. To derive certain command signals for the controller of the present invention, position sensing switches 24 and 25 are provided in proximity to each edge of sheet 21, to sense when gauge 22 reaches the sheet edges. For unidirectional scanning measurements, assuming gauge 22 scans from left to right, pulses are respectively derived from switches 24 at the beginning and end of each scan. The pulses from switches 24 and 25 are respectively supplied to set and reset input terminals of flip-flop 26 which includes separate set and reset output terminals on which are derived binary one levels when the flip-flop is set and reset. Activation of flip-flop 26 to the set state in response to a pulse from switch 24, causes a binary 1 to be derived from the set output of the flip-flop and closure of normally open-circuited switches 27 and 28, respectively connected to the output of gauge 22 and the input of actuator 15. In response to flip-flop 26 being reset, during the time interval from the completion of a scan of gauge 22 at the right side of sheet 21 to the beginning of the next left to right scan, a binary zero level is supplied by the set output of flip-flop 26 to switches 27 and 28. Thereby, the controller is responsive to gauge 22 only while the gauge is measuring a sheet property; during the interval while the controller is unresponsive to the gauge, the controller has no effect on the actuator 15 and certain elements in moving average filters included in the controller are disabled.

The continuous, analog moving average filter of FIG. 1 has a LaPlace transform in accordance with Equation (1), supra. The transform of Equation (1) is implemented by feeding the d.c. output signal passed through switch 27 to analog integrator 32, including high gain, d.c. operational amplifier 29 having a resistor 30 in its input circuit and a capacitor 31 in its negative feedback circuit. The values of resistor 30 and capacitor 31 are selected so that the time constant of integrator 32 is equal to an integral number of the measuring scan time of gauge 22. For the controller to be responsive to the most recent machine direction variations, the time constant of integrator 32 is selected to equal one scan time of gauge 22 from the left edge of sheet 21 to the right edge of the sheet. If a variable speed scan is provided for gauge 22, the time constant of integrator 32 can be appropriately varied by controlling the value of resistor 30 or capacitor 31 by an automatic controller responsive to the scanning speed of the gauge. By selecting the time constant of integrator 32 to be equal to the scan time of an integral number of measuring scans of gauge 22, the output of the integrator is an indication of the machine direction properties of sheet 21, exclusively of the cross direction and random variations of the sheet.

To enable the output of integrator 32 to be supplied continuously as an effective and accurate controller for machine direction properties of sheet 21 during the present and at least one previous scan of gauge 22 across sheet 21, it is necessary in accordance with the present invention to continuously move the scan integral across the sheet as the gauge is scanning. To this end, the output of integrator 32 is applied to a delay element 33, having a delay time equal to the delay time of integrator 32. Typically, delay element 33 is a magnetic tape recorder having an input head responsive to the output of integrator 32 and an output head for deriving the delay element output signal. The magnetic tape of delay element 33 and the input and output heads of the delay element are spaced so that the delay time interposed by the delay element equals the time constant of integrator 32. If a variable speed scanning head 22 is employed, the magnetic tape speed is appropriately varied.

To provide a delay equal to the time for an integral number of measuring scans, the signal in delay element 33 must be frozen or maintained stationary while gauge 22 is not traversing the sheet from left to right. To this end, the magnetic tape of delay element 33 is stopped by suitable braking and motor deactivating means responsive to a binary one level being derived at the reset output of flip-flop 26.

The delayed, integrated output of delay element 33 and the undelayed integrated output of integrator 32 are respectively supplied to negative and positive input terminals of difference node 34. Thereby, difference node 34 derives an analog, d.c. output signal having a value that continuously varies as gauge 22 scans from left to right across sheet 21. The value of the output signal of node 34 is directly proportional to the value of the sheet property for one or more of the left to right scans of the gauge, on a temporal basis. It is evident that the output of node 34 is continuously representative of the moving average of gauge 23 while the gauge is measuring the properties of sheet 21 since integrator 32 provides a continuous average of the sheet properties and has a time constant selected to remove cross direction and random variations. The output of integrator 32 is directly proportional to the integral of the gauge response since the measurment began. Because of the delay action of delay element 33, in combination with the subtraction performed in node 34, the output signal of node 34 is equal to the average value over the interval of the selected integral number of scan times.

The moving average indicating output signal of node 34 is compared with a set point value for the machine direction characteristic, i.e., bone dry basis weight, of sheet 21. To this end, a d.c. analog signal source 35 is provided and derives a signal having a magnitude equal to the set point value. The output signal of node 34 is compared with the set point value by supplying the set point signal to a positive input of subtraction node 36, which includes a negative input respsonsive to the output signal of node 34. The output signal of node 36 is thereby an error signal having a polarity and magnitude representing the difference between the filtered moving average value and the set point value. If integrator 32 is susceptible to being saturated because it is responsive to a signal of only one polarity for a prolonged duration, saturation is avoided by connecting the signal coupled through switch 27 directly to delay element 33 and node 34 and by feeding the output of node 34 to integrator 32. The output of integrator 32 would be coupled to a negative input of node 36, and would not saturate because the bipolarity output of node 34 would have an average value of zero over any prolonged duration.

Because of the substantial dead time between the time valve 13 is activated and the time when the activation of the valve is reflected in the bone dry basis weight of sheet 21 as monitored by gauge 22, it is necessary, to provide continuous control of valve 13, to model the characteristics of the paper making machine 11 and its controller, as well as the delay time between valve 13 and gauge 22.

To provide the modeled control, the output of the controller, i.e., the position of valve 13, is monitored by feeding the position indication of shaft 14, as derived at the slider 17 of potentiometer 18, as d.c. input voltage to model reference network 411. Network 411 includes a circuit 421 with a transfer function, $G_p(s)$, having static and dynamic responses that are substantially the same as those of paper making machine 11. Circuit 421 also includes a delay element, represented by the term $e^{-sT}$, equal to the transport lag time from valve 13 to gauge 22. The output signal of circuit 42 is supplied to circuit 431 that has the same transfer function as the moving average filter comprising integrator 32, delay element 33 and difference node 34. The delay element included in the circuit comprising moving average filter 431 is activated in response to the condition of the reset output of flip-flop 26, in the same manner as described supra with regard to the delay element 33.

The output signal of moving average filter circuit 431 is supplied to a negative input terminal of difference node 441, having a positive input terminal directly responsive to the signal derived from slider 17. Thereby, difference node 441 derives an output signal that approximates variations derived from the paper making machine 11 in response to changes in the position of valve 13, during the transport lag interval. The continuously derived signal from node 441 is supplied to a negative input terminal of difference node 451, having a positive input terminal responsive to the error output signal of difference node 36. The output signal of difference node 451 is, thereby, a signal that is continuously derived while gauge 22 is measuring the properties of sheet 21 as the gauge is being scanned from left to right. The signal derived from difference node 451 represents the correction which is to be applied to valve 13 to enable the bone dry basis weight of sheet 21 to be maintained at the set point value of source 35.

The signal derived from node 451 is coupled to a conventional proportional integral controller 461, having an output that is fed through switch 28 to actuator 15 while gauge 22 is being scanned from left to right to measure the properties of sheet 21. To this end, switch 28 is closed in response to the set output of flip-flop 26 being in a binary 1 state, whereby the error signal derived from node 451 is applied as an input to actuator 15. When gauge 22 is being scanned in the reverse direction or when the gauge is stationary at either edge, i.e., while no measurements are being derived from the gauge, a binary 1 is derived from the reset output of flip-flop 26, causing the delay process of element 33 and the delay element of filter 431 to be stopped. Thereby, the output of integrator 32 remains stationary while gauge 22 is not measuring the properties of sheet 21 and all other temporally associated operations of the controller are frozen so that the transfer function of Equation (1) is implemented from scan to scan and not terminated upon completion of a scan.

The system of FIG. 1 can be modified so that measurements can be derived from gauge 22 as it is being scanned at the same speed in both directions across the sheet, i.e., so that meaningful data can be derived from gauge 22 as it scans sheet 21 from left to right and right to left. With bi-directional scanning, the moving average filter in the FIG. 1 system must have a time interval that is an integral multiple of an even number of scans, i.e., two, four, six, etc. scans. It is preferable to employ two scans, rather than a higher number of scans so that the control is in response to the most recent machine direction variations of sheet, rather than to the machine direction variations which have occurred in the more distant past. To these ends, the time constants of integrator 32 and the integrator included in moving average filter circuit 431 are adjusted to equal the time required for an integral, even number of the scans. Similarly, the delay time of element 33 and corresonding element in filter 431 are adjusted to equal the time required for the selected, even number of scans.

To provide a continuous response to the output of gauge 22 and control actuator 15 for bi-directional scanning, switches 27 and 28 are closed whenever gauge 22 is scanning sheet 21, whereby delay element 33 and the corresponding element of filter circuit 43 are frozen only while gauge 22 is at the two edges of sheet 21. To these ends, switches 24 and 25 are modified so that they respectively derive a positive pulse in response to gauge 22 initially reaching the left and right edges of sheet 21. Switches 24 and 25 respectively derive a negative pulse in response to the gauge 22 leaving the left and right edges and initiating a scan. The positive pulses derived from position sensing switches 24 and 25 are respectively applied to one shot networks 66 and 67, while the negative pulses derived from the switches 24 and 25 are respectively applied to input terminals of one shot networks 68 and 69. One shot networks 66–69 derive positive, relatively short duration pulses in response to the pulses from position sensing switches 24 and 25 to which they are responsive. The pulses from one shot networks 66 and 67 are applied to OR gate 71, having an output that is fed to a reset input terminal of flip-flop 72. The pulses from one shot networks 68 and 69 are applied to OR gate 73, which derives an output that is coupled to set input terminal of flip-flop 72. Flipflop 72 has a reset output terminal that is driven to one state while gauge 22 is not scanning between the edges of sheet 21. The binary 1 at the rest output of flip-flop 72 is applied as a control signal to delay element 33 and the corresponding delay element of filter circuit 431, causing the delay elements to be frozen. When flip-flop 72 is set, a binary 1 signal is derived at a set output terminal of the flip-flop. The binary 1 signal at the set output terminal of flip-flop 72 is coupled to switches 67 and 68, causing the switches to be closed, whereby the controller is responsive to the output of gauge 22 whenever it is scanning and signals are continuously applied to actuator 15 during the scanning intervals.

Figures 3, 4, 5:
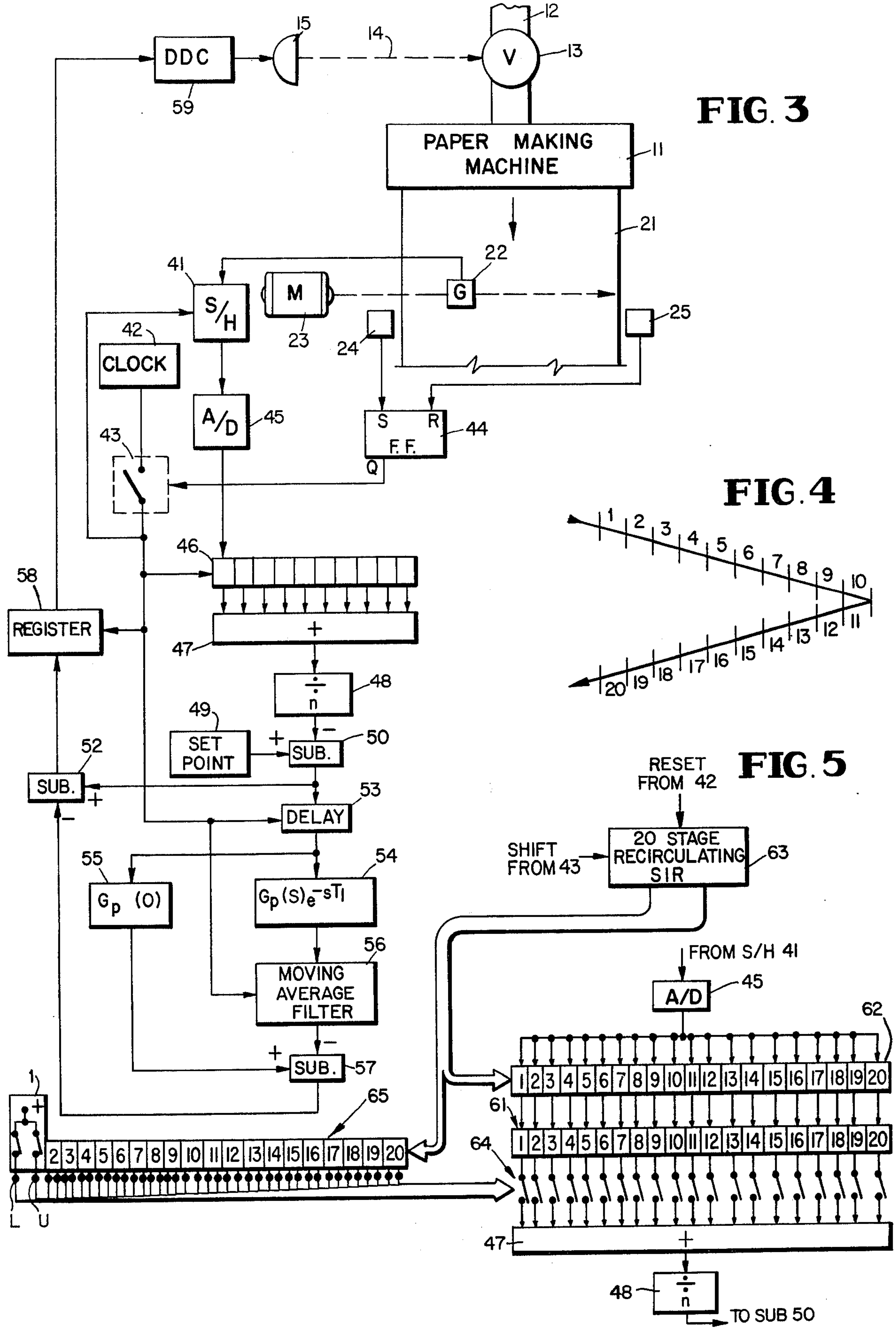
FIG. 3 is a diagram of a discrete, sampled controller in accordance with the present invention and wherein the gauge measures while being scanned in only one direction.
FIG. 4 is a diagram helpful in describing the principles of spatial averaging.
FIG. 5 is a diagram illustrating changes to be made to the system of FIG. 3 to enable the scanning gauge output to be spatially averaged.

Reference is now made to FIG. 3 of the drawing wherein there is illustrated a modification of the system of FIG. 1 such that the analog output signal of scanning gauge 22 is periodically sampled and actuator 15 is responsive to a periodically derived signal, rather than a continuously derived signal. The sampled signal is converted into a digital signal which is supplied to a moving average filter that functions, basically, in accordance with Equation (2). The moving average is computed for the number of samples over the integral number of scans of gauge 22 for which it is desired to conduct the moving average process. The system of FIG. 3 also includes a sampled model for the paper making machine between valve 13 and gauge 22, as described in the previously mentioned, copending Rice application.

To these ends, the d.c. analog output signal of scanning gauge 22 is supplied to sample and hold network 41. Network 41 periodically samples the output of gauge 22 while the gauge is scanning across sheet 21 during the measurement process. To this end, a source of clock pulses 42 is supplied to a sample input terminal of network 41 through normally open-circuited switch 43 and sampling is performed in response to the trailing edge of each pulse at the sample input terminal. Switch 43 is controlled by a set output terminal of flip-flop 44, having set and reset input terminals responsive to position detecting switches 24 and 25 at opposite edges of sheet 21. With switches 24 and 25 arranged as described in conjunction with FIG. 1, switch 43 is closed only while gauge 22 is scanning sheet 21 from left to right. If gauge 22 measures the properties of sheet 21 for an even number of scans and the gauge measures the sheet in both directions, whereby the switches 24 and 25 are configured as described in conjunction with FIG. 2, the set output terminal of flip-flop 44 has a binary 1 state whenever gauge 22 is being scanned across sheet 21 and switch 43 is accordingly closed while scanning is performed in both directions.

The variable amplitude, analog samples periodically derived from sample and hold network 41 are supplied as an input signal to analog to digital converter 45. In response to each sample supplied to converter 45, the converter derives a multi-bit, parallel binary signal that is supplied to the first cell of multi-cell memory 46. Memory 46 is provided with a number of cells equal to the number of samples in the moving average filter. For example, if the moving average filter has an interval of one sheet width and 10 samples are taken across the width with undirectional scanning measurements, 10 cells are included in memory 46; if gauge 22 measures the sheet while the gauge is scanning in both directions, 10 samples per scan are taken, and the moving average filter has an interval of two scan times, 20 cells are provided in memory 46. The contents of each cell within memory 46 are shifted to the next higher cell (the cell to the right) each time that a sampling interval has been completed, as indicated by the leading edge of each pulse derived from clock source 42 that is coupled through switch 43. After each sample has been shifted completely through memory 46, it is shifted out of the highest numbered cell within the memory (the cell at the extreme right of the memory) whereby the sample is no longer retained in the memory. To this end, memory 46 is provided with a shift input terminal driven by the output of clock source 42 through switch 43. Thereby, a signal representing the most recent indication of the sampled output signal of gauge 22 is stored in the first cell of memory 46 and similar signals for the sampling intervals removed in time from the present by sampling intervals numbered 1, 2, etc. are stored in cells numbered 2, 3, etc. In the specifically illustrated embodiment, after ten sampling intervals have been completed, the signal value stored in the 10th cell of memory 46 is shifted out of the memory and discarded. Thereby, memory 46 has the capability of storing signals indicative of the value of samples over a period equal to one scan of gauge 22 across sheet 21.

To calculate the moving average, the values of all of the samples loaded in memory 46 are added together and the resultant sum is divided by the number of samples. To these ends, the multi-bit, parallel signals stored in all of the 10 cells of memory 46 are simultaneously supplied to an addition matrix 47 which derives a multi-bit, parallel, binary signal having a magnitude equal to the sum of the values of the samples stored in the 10 cells of memory 46. Thereby, the magnitude of the signal derived from addition matrix 47 is susceptible to change each time a new sample is supplied to memory 46. The output signal of addition matrix 47 is supplied to division matrix 48, wherein the magnitude of the signal derived from addition matrix 47 is divided by the number of samples used to calculate the moving average i.e., the number of cells in memory 46. Matrix 48 thereby derives a multi-bit, parallel, binary signal having a magnitude representing the moving average across the width of sheet 21 for one scan of gauge 22 across the sheet, and this average is updated multiple times during each scan of gauge 22, depending upon the sampling rate of clock source 42.

The filtered, moving average output signal of division matrix 48 is compared in subtraction matrix 50 with a set point signal derived from source 49. The set point signal from source 49 is multi-bit, parallel binary signal that is set into the source, either on a predetermined basis from an operator input, or in response to a statistical analysis of the output of gauge 22, as disclosed in U.S. Pat. No. 3,622,448, to Adams. Subtration network 50 responds to the moving average and set point signal magnitudes to derive a multi-bit parallel, binary error signal having a magnitude and polarity indicative of the difference between the calculated moving average and set point values.

To enable control to be performed within the transport lag from valve 13 to gauge 22, the error signal derived from subtraction matrix 50 is supplied to a model reference system of the type disclosed in the aforementioned, co-pending Rice application. To these ends the output of subtraction matrix 50 is supplied as a minuend input to subtraction matrix 52, and to one sample time delay element 53. The delay time of element 53 is controlled by supplying the output of clock source 42 to a shift input of the delay element. Thereby, delay element 53 derives a binary, multi-bit output signal having a magnitude and polarity equal to the magnitude of the moving average filter output, one sample removed from the present time, minus the value of the signal magnitude derived from set point source 49. The output signal of the delay element 53 is supplied in parallel to digital networks 54 and 55 which respectively model the dynamic (including transport lag) and steady state characteristics of the paper making machine from valve 12 to gauge 22.

The binary, multi-bit, parallel output signal of one of elements 54 and 55 is supplied to a digital network having the same characteristics as the moving average filter comprising memory cells 46, summing matrix 47, and division matrix 48. In the specifically illustrated embodiment, the output signal of dynamic model 54 is applied to moving average filter network 56. To provide for shifting of the signals between the different cells of the memory included in network 56, which memory is identical to the memory 46, element 56 is responsive to the output signal of clock source 42, as coupled through switch 43. The parallel, multi-bit, binary output signals of elements 55 and 56 are respectively applied to positive and negative input terminals of binary subtraction matrix 57. Subtraction matrix 57 thereby derives a multi-bit, parallel, binary output signal having a magnitude and polarity representing variations of the bone dry basis weight of sheet 21 during the transport lag from the time change is made to valve 12 to the time that change is reflected in the signal derived from gauge 22.

The modeled error signal derived from subtraction matrix 57 is compared with a signal having a magnitude and polarity representing the actual error. To this end, the modeled error signal derived from subtraction network 57 is supplied as a negative input to subtraction metrix 52, having a positive input directly responsive to the actual error, as indicated supra. Thereby, subtraction matrix 52 periodically derives, once a sample, binary multi-bit parallel output signal having a magnitude equal to the actual error signal magnitude relative to the modeled error signal magnitude. The output signal of subtraction matrix 52 is supplied to register 58.

The signal stored in register 58 is read out to direct digital controller 59 once each time a sample is taken from gauge 22 is measuring sheet 21, by virtue of connecting the output of clock 42 through switch 43 to read out control terminal of the register. Thereby, direct digital controller 59 is capable of deriving a control signal for actuator 15 once each sample time of gauge 22. The output signal of direct digital controller 59 is thereby capable of controlling the position of valve 12, and therefore the machine direction bone dry basis weight of sheet 21, multiple times during each scan of gauge 22 between the edges of sheet 21.

In the previously described embodiments of the invention, the moving average filter is taken over an integral number of scans in the time domain. According to a further embodiment, the moving average filter is taken over a spatial interval of one or more scans for bi-directional scanning. The principles of the spatial moving average filter, for a 10 sample per scan example, are illustrated in FIG. 4. In FIG. 4, the first scan is assumed from left to right, to cover samples one through 10, while the second scan is from right to left to cover samples 11 to 20. Samples one and 20 are adjacent the left edge of sheet 21, while samples 10 and 11 are adjacent the right edge of the sheet. After the first scan has been completed, the moving average is computed in response to samples one through 10. As the gauge begins the second scan, and after sample 11 has been taken, the moving average is computed in response to samples one through 9 and 11. As gauge 22 moves farther to the left during the second scan, the moving average filter is computed in response to samples one through eight, 11 and 12. As the gauge continues to scan, successive samples from the first scan are removed as additional samples from the second scan are added, whereby upon the completion of sample 19, the moving average filter is computed in response to samples one and 11 through 19, and upon completion of the last sample of the second scan, the moving average filter is computed in response to samples 11 through 20. The complete sequence for one scan interval is thereby in accordance with:

TABLE

| Sample No. | Samples Taken For Moving Average Calculation |
|---|---|
| 1 | 1 & 19–11 |
| 2 | 1, 2 & 18–11 |
| 3 | 1–3 & 17–11 |
| 4 | 1–4 & 16–11 |
| 5 | 1–5 & 15–11 |
| 6 | 1–6 & 14–11 |
| 7 | 1–7 & 13–11 |
| 8 | 1–8 & 12, 11 |
| 9 | 1–9 & 11 |
| 10 | 1–10 |
| 11 | 11 & 9–1 |
| 12 | 11, 12 & 8–1 |
| 13 | 11–13 & 7–1 |
| 14 | 11–14 & 6–1 |
| 15 | 11–15 & 5–1 |
| 16 | 11–16 & 4–1 |
| 17 | 11–17 & 3–1 |
| 18 | 11–18 & 2, 1 |
| 19 | 11–19 & 1 |
| 20 | 11–20 |

In the Samples Taken For Moving Average Calculation column of the Table, the sample numbers on the left side of the ampersand indicate samples taken during the scan associated with the sample number of the Sample No. column, and while sample numbers on the right side of the ampersand indicate samples taken from the previous scan.

Apparatus for enabling the spatial moving average filtering to be performed is illustrated in the schematic drawing of FIG. 5. FIG. 5 is limited solely to the changes required in the time domain moving average filter to provide the spatial moving average, and associated apparatus. It is to be understood that the spatial moving average filter illustrated in FIG. 5 is employed as a moving average filter responsive to analog to digital converter 45, as well as the spatial moving average filter responsive to modeling network 54, although the following description is for the filter responsive to converter 54.

The spatial moving average filter of FIG. 5 comprises a storage device having a number of multi-bit, parallel, binary storage cells, equal in number to twice the number of samples that is used to compute the spatial moving average. Hence, for the exemplary moving average described in conjunction with FIG. 4 and the Table, the memory 61 has 20 cells, each capable of storing a multi-bit, parallel binary signal representing the magnitude of one sample derived from analog to digital converter 45. Analog to digital converter 45 selectively feeds signals into the 20 cells of memory 61 in the sequence in which the samples are derived from gauge 22, with sample one (see FIG. 4) being loaded in the first cell (at the left side) of memory 61, and sample 20 being loaded in the cell at the right side of the memory, and the intermediate numbered samples being supplied to correspondingly numbered cells.

To these ends, a twenty cell, parallel, multi-bit, sequentially energized switch network 62 is provided. Each of the cells of network 62 has a number of switches equal to the number of the bits in the multi-bit output of analog to digital converter 45, and these several switches in each cell are connected to corresponding input terminals of memory 61 and output terminals of converter 45. To provide for sequential energization of the switches in the cells of network 62, a twenty state recirculating shift register 63 is provided. Register 63 is shifted each time the output of gauge 22 is sampled by network 41 by connecting the output of clock source 42, as coupled through switch 43, to a shift input terminal of the register. The twenty stages of register 63 are connected to the switches of correspondingly numbered cells in network 62 to provide the sequential energization of the switches and coupling of the signals from converter 45 into the appropriately numbered cells of memory 61. To prevent possible mis-synchronization, register 63 is reset to its initial state when gauge 22 begins each scan from the left edge of sheet 21. To this end, register 63 is provided with a reset input terminal responsive to the output of one shot multi-vibrator 26, which is utilized in conjunction with the bi-directional scanning system of FIG. 5, and was previously described in conjunction with FIG. 2.

To enable the data stored in the different cells of memory 61 to be read out and thereby provide a moving window to calculate the average, a set of latched switches 64 is provided for each of the cells of memory 61; one latched switch is provided in each of the sets for each of the parallel, binary bits at the output of each of cells 61. Latched switches 64 are arranged so that all of the switches in a particular set are activated to the closed state in response to an input latching control signal and remain in the closed state until an unlatching control signal is supplied to them. Latching and unlatching of switches 64 are controlled in response to the energized stage of register 63.

To these ends, each of the stages of register 63 has an output terminal connected to a separate control circuit within network 65, whereby one circuit within network 65 is provided for each of the 20 stages of register 63. Each of the circuits within the network 65 includes a pair of control output terminals, on which separate binary signals are derived to control latching and unlatching of switches 64. The latching control output terminals of the circuits in network 65 are connected to the same numbered set of switches 64 to provide latching, whereby, e.g., the latching control output terminal of circuit one of the network 65 is connected to the latch input of set one of the switches 64, the latching control output terminal of circuit two of network 65 is connected to the latch input of set two of switches 64, etc., and the latching control output terminal of circuit 20 of network 65 is connected to the latch input of set 20 of switches 64. The unlatching control output terminals of the several circuits in network 65 are connected to the set of the switches 64 having a number that is the 20's complement of the number of the circuit in network 65, whereby, e.g., the unlatching control output terminal of circuit one of network 65 is connected to the unlatch input of set 20 of switches 64, the unlatching control output terminal of circuit two of network 65 is connected to the unlatch input of set 19 of switches 64, etc. and the unlatching control output terminal of circuit 20 of network 65 is connected to the unlatch input of set one of switches 64. It is thereby seen that at any time output signals from 10 of cells 61 are simultaneously coupled through 10 different sets of switches 64 in accordance with the spatial moving average technique described in conjunction with FIG. 4.

To calculate the moving average, the multi-bit parallel, binary signal coupled through each of switches 64 is connected to addition matrix 47, which drives division network 48, as described in conjunction with FIG. 3. For the example, described, the division factor of matrix 48 is selected to equal 10, the number of samples included in the spatial moving average. Thereby, the output signal of division matrix 48 is a multi-bit, parallel binary signal having a magnitude equal to the spatial moving average value.

While there have been described and illustrated several specific embodiments of the invention, it will be clear that variations in the details of the embodiments specifically illustrated and described may be made without departing from the true spirit and scope of the invention as defined in the appended claims. For example, the digital hardware embodiments of FIGS. 3 and 5 could be implemented with a properly programmed, general purpose digital computer responsive to the output of analog to digital converter 45 that drives direct digital controller 59.

What is claimed is:

1. A method of controlling a characteristic of a moving sheet affected by a sheet processing machine comprising measuring a property of the sheet affected by the characteristic by scanning a gauge for the property in a direction between the sheet edges over a substantial width of the sheet a plurality of times, averaging a response of the gauge over an integral number of the scans for the substantial width of the sheet so as to substantially remove cross direction variations in the gauge response, moving the average over the substantial width to different points across the width, and in response to the moving average controlling the characteristic in the machine direction a plurality of times during the scans while the gauge is measuring the property.

2. The method of claim 1 wherein the most recent gauge response at the different cross sheet points is included in the average.

3. The method of claim 1 wherein the property is measured while the gauge is scanned in only one direction, and the response is averaged over N of the unidirectional scans, wherein N is any integer.

4. The method of claim 3 wherein N equals 1.

5. The method of claim 3 wherein the number equals 2.

6. The method of claim 1 wherein the property is measured while the gauge is scanned in both directions, and the response is averaged over the time required for an even number of scans.

7. The method of claim 1 wherein the property is measured while the gauge is scanned in both directions, and the response is spatially averaged over N of the scans, wherein N is any integer.

8. The method of claim 7 whrein N equals 1.

9. The method of claim 1 wherein the average is derived by integrating the gauge response over an integral number of scans, and the average is moved by delaying the integrated response for a time equal to the time required for the integral number of scans, and subtracting the undelayed integrated response from the delayed integrated response.

10. The method of claim 1 wherein the average is derived and moved by sampling the gauge responses a plurality of times during each scan, storing the response for the integral number of scans, and accumulating the stored response whereby the moving average is updated in response to each sample, and controlling the property each time the moving average is updated.

11. The method of claim 1 wherein a transport lag exists from the time the control is made to the time the gauge measures the portion of the sheet controlled during the control step, modeling the response of the machine in response to the control, and controlling the machine direction characteristic in response to the modeled response more often than once a transport lag.

12. The method of claim 1 wherein the average is determined and moved in response to the gauge response from the present and at least one previous scan of the gauge so that the moving average is susceptible to change as the gauge scans across the sheet.

13. In an apparatus for controlling a characteristic of a moving sheet affected by a sheet processing machine, means for measuring a property of the sheet affected by the characteristic, means for scanning the measuring means for scanning the measuring means in a direction between the sheet edges over a substantial width of the sheet a plurality of times, means responsive to the measuring means for averaging a response of the measuring means over an integral number of the scans for the substantial width of the sheet so as to substantially remove cross direction variations in the measuring means response, means for moving the average over the substantial width to different points across the width, and means responsive to the moving average for deriving a machine direction control signal for the characteristic a plurality of times during the scans while the measuring means is measuring the property.

14. The apparatus of claim 13 wherein the means for averaging and the means for moving the average includes means for including the most recent measuring means response in the moving average.

15. The apparatus of claim 13 wherein the property is measured while the measuring means is scanned in only one direction, and the response is averaged over N of the unidirectional scans, wherein N is any integer.

16. The apparatus of claim 13 wherein N equals 1.

17. The apparatus of claim 13 wherein the property is measured while the measuring means is scanned in both directions, and the response is averaged over the time required for an even number of scans.

18. The apparatus of claim 17 wherein the number equals 2.

19. The apparatus of claim 13 wherein the property is measured while the measuring means is scanned in both directions, and the response is spatially averaged over N of the scans, wherein N is any integer.

20. The apparatus of claim 19 wherein N equals 1.

21. The apparatus of claim 13 wherein the means for averaging includes means for integrating the measuring means response over an integral number of the scans, and the means for moving includes means for delaying the integrated response for a time equal to the time required for the integral number of scans, and means for subtracting the undelayed integrated response from the delayed integrated response.

22. The apparatus of claim 13 wherein the means for averaging and moving include means for sampling the gauge response a plurality of times during each scan, means for accumulating the stored responses for the integral number of scans, whereby the moving average is updated in response to each sample the means for deriving the signal is responsive to each update of the moving average.

23. The apparatus of claim 13 wherein a transport lag exists from the time the control signal is derived to the time the measuring means measures the portion of the sheet controlled by the control signal, means for modeling the response of the machine in response to the control signal and means for varying the control signal in response to the modeled response more often than once a transport lag.

24. The apparatus of claim 13 wherein the means for averaging and the means for moving are responsive to the measuring means response from the plural scans and include means for storing the responses from the plural scans and means for combining the stored responses with the measuring means response so that the moving average is susceptible to change as the measuring means scans across the sheet.

25. In an apparatus for controlling a characteristic of a moving sheet affected by a processing machine in response to measurements of a sheet property provided by measuring means on successive scans across a substantial width of the sheet in a direction between the sheet edges, means for producing a moving average of the measurements, said average including a quantity of measurements from a current to scan and from one previous scan which is equal to the quantity of measurements obtained on one complete scan across said substantial width, means correlated with the location across the sheet width of the measurement currently taken by said measuring means for determining which measurements from said current scan and said previous scan are included in the current value of the moving average, and means responsive to the moving average to derive a signal for controlling said machine so as to influence the value of said characteristic in the machine direction along the sheet.

26. In an apparatus for controlling a characteristic of a moving sheet affected by a processing machine in response to measurements of a sheet property provided by measuring means on successive scans across a substantial width of a sheet in a direction between the sheet edges, means for producing a moving average of the measurements, said average including measurements representing one portion of said substantial width measured during a current scan and measurements representing another portion of said substantial width measured during one previous scan, the sum of said width portions being equal to said substantial width, means correlated with the location across the sheet width of the measurements currently taken by said measuring means for progressively reducing said another portion and increasing said one portion of said substantial width whose measurements are represented in said moving average and means responsive to the moving average to derive a signal for controlling said machine so as to influence the value of said characteristic in the machine direction along the sheet.

27. In an apparatus for controlling a characteristic of a moving sheet affected by a processing machine in response to measurements of a sheet property provided by measuring means on successive scans across a substantial width of a sheet in a direction between the sheet edges, means for producing a moving average of the measurements, said average including a number of measurements from a current scan and from one previous scan which is equal to the number of measurements obtained on one complete scan across said substantial width, means correlated with the location across the sheet width of the measurement currently being taken by said measuring means for selecting the measurements from said current scan and said previous scan so as progressively to decrease the number of measurements from the previous scan and to increase the number of measurements from the current scan included in the current value of the moving average, and means responsive to the moving average for deriving a signal for controlling said machine so as to influence the value of said characteristic in the machine direction along the sheet.

28. In the apparatus for controlling a characteristic of a moving sheet affected by an adjustment to a processing machine, scanning gauge means for producing a plurality of sheet property measurements as spaced locations across the width of the sheet on each of a plurality of scans across a substantial width of the sheet, means for storing a plurality of said measurements, means responsive to the stored measurements for producing a moving average, means responsive to at least some of said locations across the sheet width for applying the measurements to said moving average producing means so that the value of the average produced thereby is indicative of measurements derived from both a current scan and a previous scan and equally represents the sheet property measurements at each of said locations, whereby as the scanning proceeds the moving average progressively changes in response to the location currently measured, and means responsive to the moving average for actuating said processing machine adjustment to control said characteristic in the machine direction along the sheet.

29. In an apparatus for controlling a characteristic of a moving sheet affected by a processing machine in response to measurements of a sheet property provided by measuring means on successive scans across a substantial width of a sheet in a direction between the sheet edges, means for producing a moving average of the measurements, said average including a number of measurements from a current scan and from one previous scan which is equal to the number of measurements obtained on one complete scan across said substantial width, means correlated with the location across the sheet width of the measurement currently being taken by said measuring means for selecting the measurements from said current scan and said previous scan so as progressively to decrease the number of measurements from the previous scan and to increase the number of measurements from the current scan included in the current value of the moving average as the more current measurements are made, and means responsive to the moving average for deriving a signal for controlling said machine so as to influence the value of said characteristic in the machine direction along the sheet.

* * * * *